United States Patent [19]

Waldenrath et al.

[11] Patent Number: 5,236,657
[45] Date of Patent: Aug. 17, 1993

[54] PROCESS FOR PRODUCING MULTI-LAYER MOULDINGS

[75] Inventors: Werner Waldenrath, Cologne; Joachim Wank, Dormagen; Wolfgang Lamaack, Grevenbroich; Dietmar Benner; Friedrich Johannaber, both of Lohmar; Karl-Heinz Jülicher, Cologne, all of Fed. Rep. of Germany

[73] Assignee: Bayer Aktiengesellschaft, Fed. Rep. of Germany

[21] Appl. No.: 645,815

[22] Filed: Jan. 25, 1991

[30] Foreign Application Priority Data

Feb. 10, 1990 [DE] Fed. Rep. of Germany ....... 4004029

[51] Int. Cl.⁵ .......................................... B29C 45/16
[52] U.S. Cl. .................................. 264/510; 264/85; 425/112
[58] Field of Search ................. 264/85, 510, 511, 523, 264/524, 537, 544, 552, 266, 267, 316, 510, 523, 547; 425/112

[56] References Cited

U.S. PATENT DOCUMENTS

| 4,675,141 | 6/1987 | Kumazaki | 264/85 |
| 4,917,594 | 4/1990 | Gellert et al. | 425/573 |
| 4,942,006 | 7/1990 | Loren | 264/85 |
| 5,000,903 | 3/1991 | Matzinger et al. | 264/511 |

FOREIGN PATENT DOCUMENTS

2199426  2/1986  Japan ............................. 264/511

Primary Examiner—Jan H. Silbaugh
Assistant Examiner—Angela Ortiz
Attorney, Agent, or Firm—Connolly & Hutz

[57] ABSTRACT

The production of multi-layer mouldings (17) from a sheet (6) injection-moulded behind with a resin can be simplified by the sheet (6) being deformed in an injection mould by means of a fluid pressure medium, in particular nitrogen, at at least 20 bar and the deformed sheet (6) injection-moulded behind with resin directly thereafter in this injection mould, a pressure keeping the deformed sheet (6) in position being maintained during the injection-moulding behind.

2 Claims, 13 Drawing Sheets

PROCESS FOR PRODUCING MULTI-LAYER MOULDINGS

The invention relates to a process for producing multi-layer mouldings from a deformable sheet and a thermoplastic or thermoset resin, the sheet being deformed in the cavity of a mould by means of a fluid medium under a pressure of at least 20 bar and injection-moulded behind with the resin.

This process is known from DE 38 40 542 C. This concerns in particular a printed plastics sheet, for example polycarbonate sheet, the imprint being applied before the deformation and is intended to be exactly placed after the deformation. The injection-moulding behind the deformed sheet serves to enhance its stability. A multilayer moulding results. The deforming of the sheet is performed in a first mould, which has a cavity corresponding to the desired geometry of the deformed sheet. The injection-moulding behind takes place in a second, separate injection mould.

Since two moulds are required, manual or automatic intermediate steps for removing the deformed sheet from the first mould and for transporting and laying into the second mould are necessary. Because the deformed sheet is relatively unstable, the placing in the second mould is very time-consuming and rejects keep occurring due to slipping of the sheet.

The object is to simplify the process described at the beginning for producing multi-layer mouldings and to lower the reject rate.

This is achieved by the deformation of the sheet being carried out in the cavity of an injection mould and by the sheet being injection-moulded behind directly thereafter in this cavity, a pressure keeping the deformed sheet in position being maintained during the injection-moulding behind.

By using the same injection mould both for the deformation of the sheet and for injection-moulding behind it with a resin, the expenditure in terms of machinery and manual effort is reduced considerably and the reject rate is reduced. Liquid or gaseous media are suitable as pressure media, gaseous media, such as compressed air or inert gases, such as nitrogen, helium, argon, being preferred. Polycarbonate is particularly suitable as sheet material. Further suitable plastic sheets or sheet materials are described in DE 38 40 542 C. However, highly stretchable metallic foils are also suitable.

It is unimportant for the novel process whether the sheets are printed or unprinted. All thermoplastics and thermoset plastics which can be injection-moulded and conform to the properties required of the end product are suitable for injection-moulding behind. The deformation of the sheet by the pressure medium takes place very quickly, so it is possible to speak of an abrupt deformation, in particular if relatively high pressures are applied. The pressure prevailing in the cavity during injection-moulding may be lower or higher than the pressure required for the deformation of the sheet, as long as it is adequate to keep the deformed sheet in position until injection-moulding and during injection-moulding. Since the deformed sheet remains fixed to the walls of the cavity by this pressure, no moulding compound can penetrate between the sheet and the walls of the cavity during the injection-moulding behind the sheet and, due to the exact placing of the sheet, a reject cannot be produced either, as occurs with a poorly or incorrectly placed sheet.

The pressure applied for the deformation of the sheet is preferably maintained during the injection-moulding behind, the pressure rising due to the operation of injection-moulding behind being lowered in a controlled manner.

This controlled lowering is performed for example by a clamping force being applied in a defined manner to the injection mould, so that excess pressure medium can escape through the gap between the mould halves to the extent that it is displaced by the polymer melt injected in. Alternatively, and even better able to be controlled, is a pressure relief by an over pressure valve in a venting line connected to the cavity.

According to a special embodiment of the novel process, the pressure medium is introduced through the injection nozzle of an injection-moulding unit assigned to the injection mould.

This has the advantage that there does not have to be any additional opening in the cavity. The fluid pressure medium in this case flows for example via a branch channel, which can be shut off by means of a slide valve or spool, into the nozzle channel.

Alternatively, the fluid medium is introduced through a special feed channel, sealed off against penetration by resin.

Here, although the disadvantage of a second opening in the cavity has to be accepted, on the other hand the mouth of this channel in the cavity can be located at a suitable point, so that inclusions of pressure medium during injection-moulding behind are ruled out with certainty.

Finally, it is also possible to feed the pressure medium in through an annular gap left between the injection nozzle and its attachment funnel to the injection mould and only once the pressure medium has been introduced attach the injection nozzle to this attachment funnel in a sealing manner, in order then to inject in the polymer melt.

Three suitable injection moulds are represented, according to the individual process steps, in section in the drawing and are explained in further detail below.

In FIGS. 1 to 5, a first mould half 1 of an injection mould is arranged on a first platen 2 and a second mould half 3 is arranged on a second platen 4. The mould half 1 has a cavity 5, over which a sheet 6 to be deformed (FIG. 1) is laid. The mould half 3 is provided with hold-down devices 7. It also has a runner 8, which is in connection via a nozzle opening 9 of an injection nozzle 10 with an indicated injection-moulding unit 11. This injection nozzle 10 has a channel 12, into which a feed channel 14 for a gaseous pressure medium, which can be shut off by means of a shut-off spool 13, opens. The channel 12 is connected to the melt space (not shown) of an injection-moulding unit 11.

Figure 1:
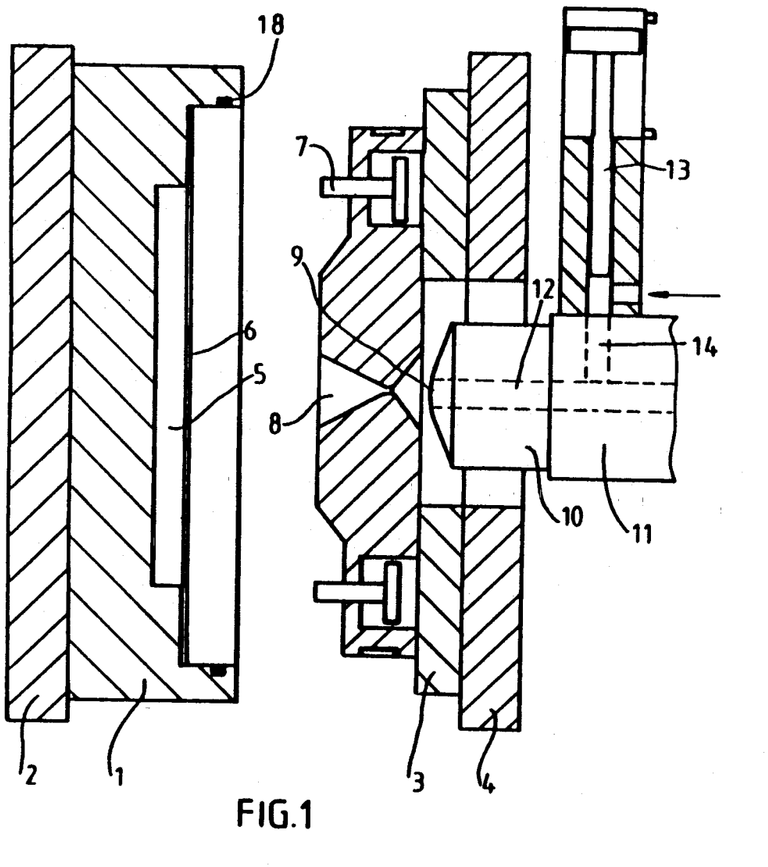
FIGS. 1 to 5 show the process sequence in a first injection mould
Figure 2:
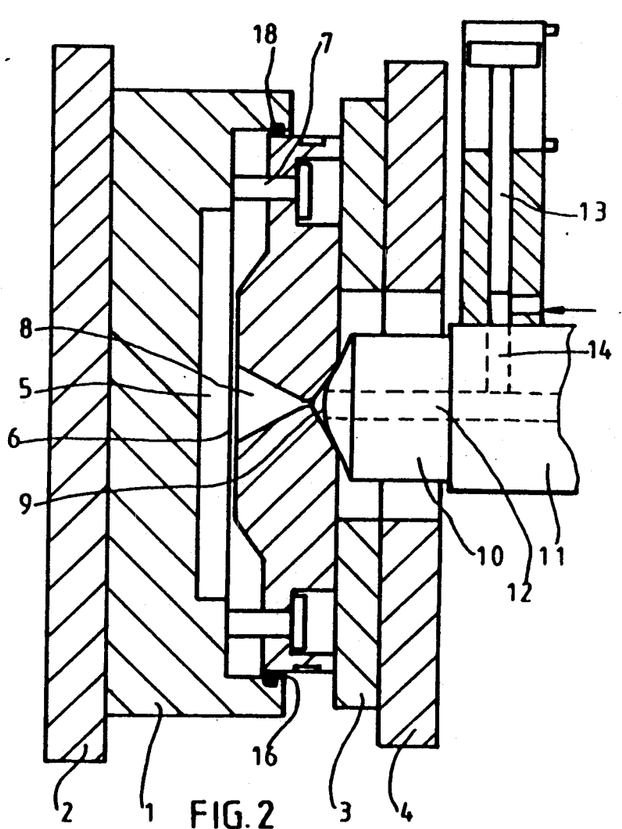

In FIG. 2 the mould halves 1 and 3 have been moved together, the mould half 3 holds the sheet 6 in position by its hold-down devices 7 and the injection nozzle 10 is attached. In this position, the seal 18 seals the cavity 5 off.

Figure 3:
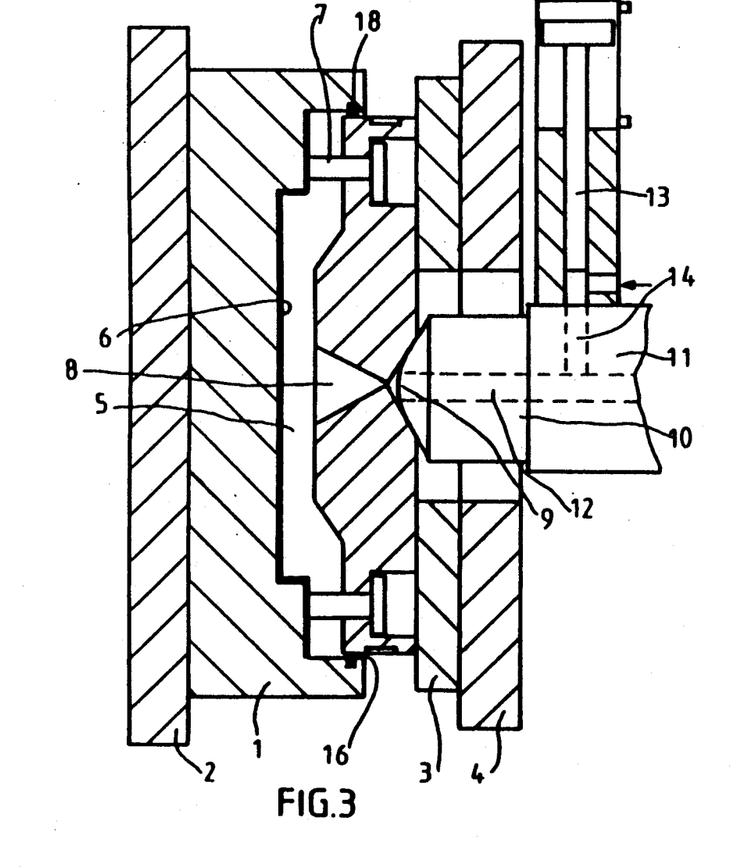

Then compressed air of 50 bar is introduced via the feed channel 14 and the nozzle opening 9, as a result of which the sheet 6 deforms abruptly and assumes the desired geometry of the cavity 5, as represented in FIG. 3. The air behind the sheet 6 is forced out through suitable venting channels or through sintered inserts (neither of which are shown).

Directly thereafter, a free-flowing thermoplastic melt 15 (thermoplastic polyurethane) is injected in by means of the injection-moulding unit 11, the pressure further building up as a result being lowered by escaping of the pressure medium through the mould gap 16 between the two mould halves 1 and 3.

Figure 4:
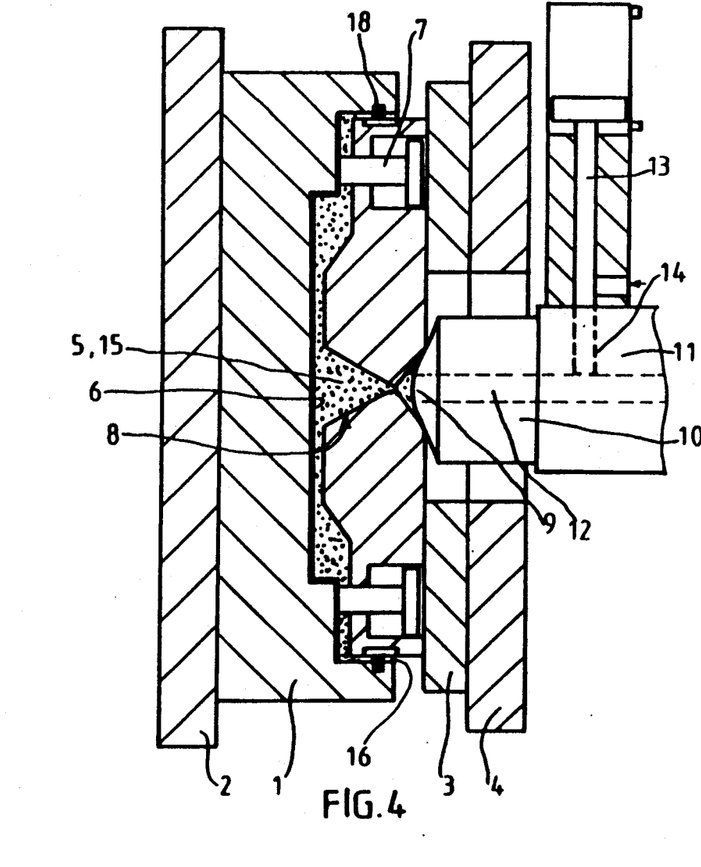

In FIG. 4 the injection mould is represented with cavity 5 filled.

Figure 5:
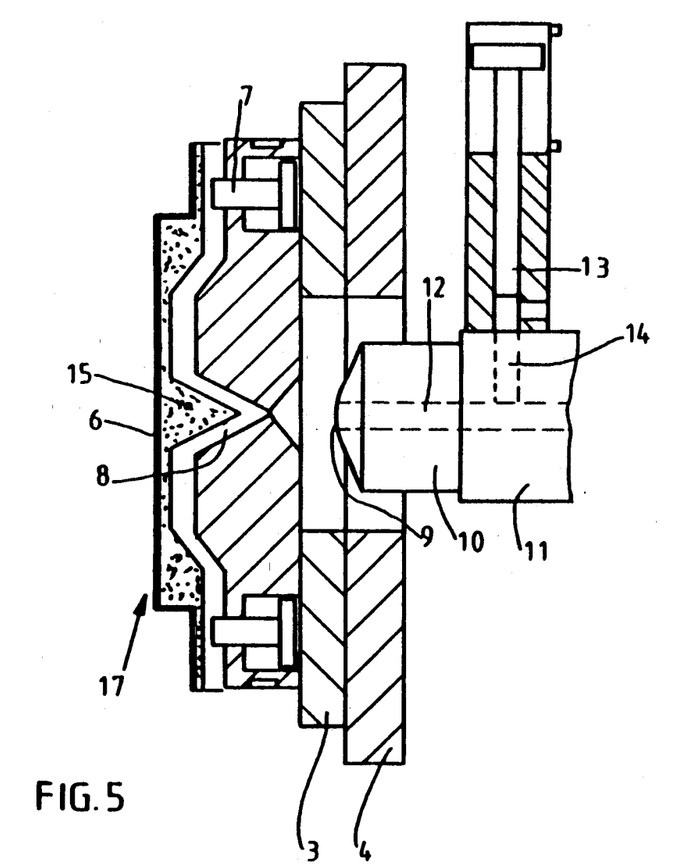
Figure 6:
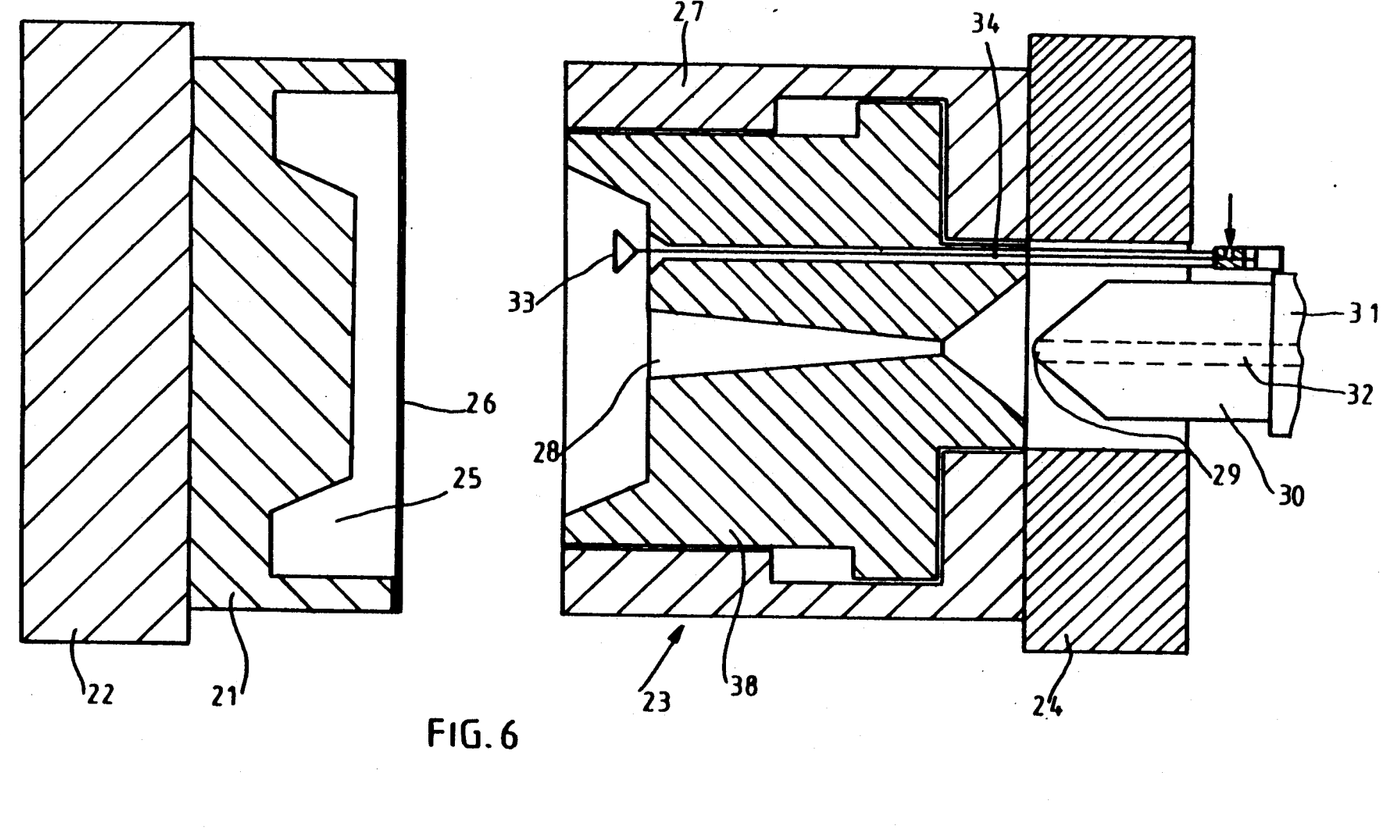
FIGS. 6 to 10 show the process sequence in a second injection mould

In FIG. 5, finally, the mould opened for removing the multi-layer moulding 17 is shown.

In FIGS. 6 to 11, a first mould half 21 of an injection mould is arranged on a first platen 22 and a second mould half 23 is arranged on a second platen 24. The mould half 21 has a cavity 25, over which a sheet 26 to be deformed is laid. The upper mould half 23 is provided with an annular hold-down device 27, in which a displaceable core 38 is arranged. This core 38 has a runner 28, which is in connection via a nozzle opening 29 of an injection nozzle 30 with an indicated injection-moulding unit 31. This injection nozzle 30 has a channel 32, which is connected to the melt space (not shown) of the injection-moulding unit 31. A separate feed channel 34 for compressed air can be shut off by means of a shut-off spool 33.

Figure 7:
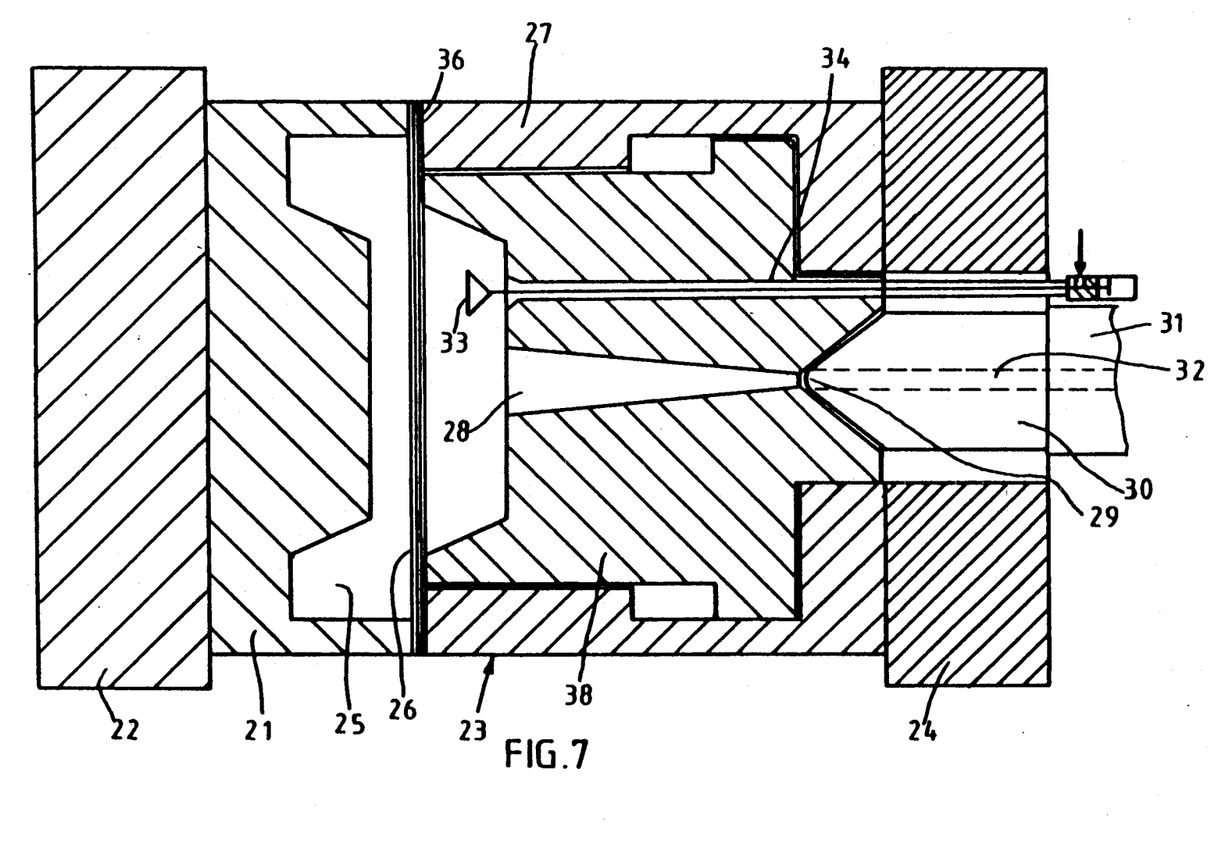

In FIG. 7, the mould halves 21 and 23 have been moved together, the hold-down device 27 holds the sheet 26 in position and the injection nozzle 30 is attached.

Figure 8:
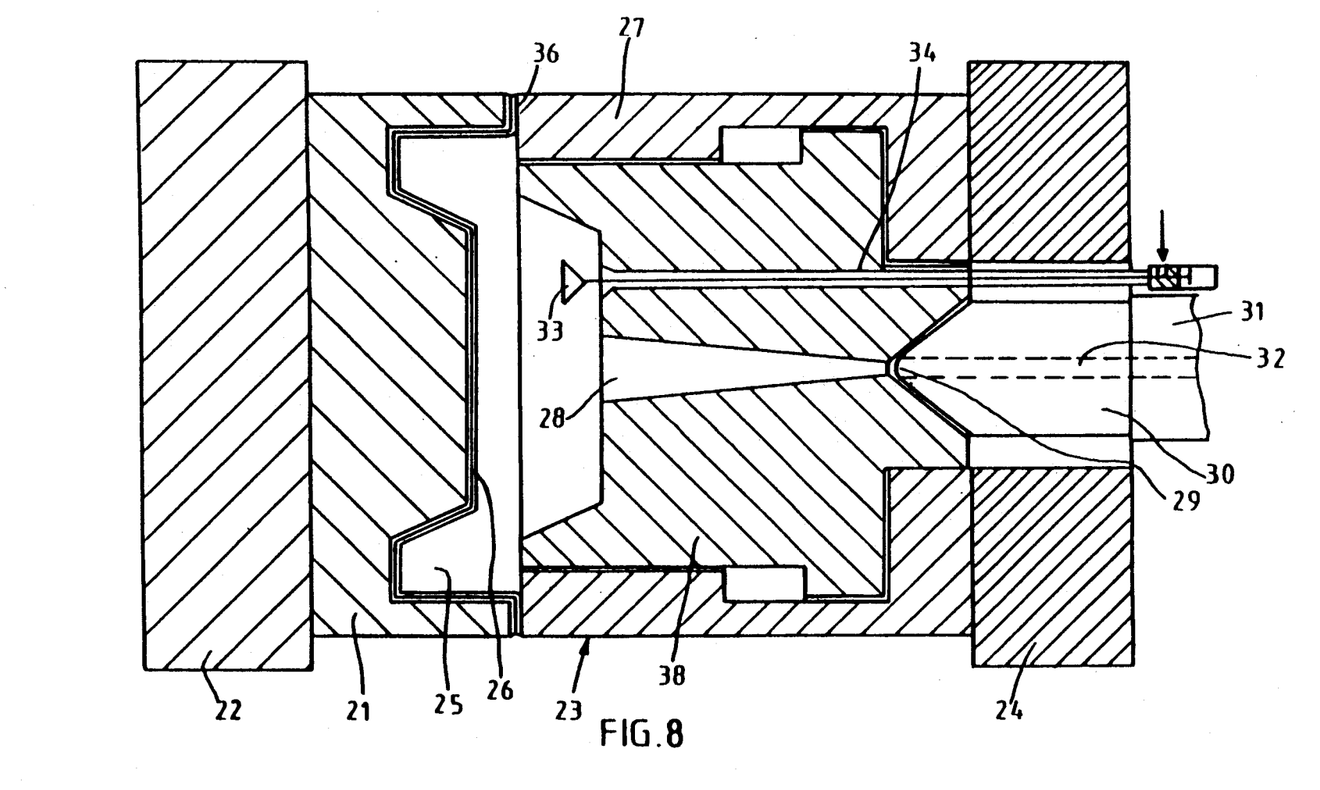

Then compressed air of 300 bar is introduced via the feed channel 34, as a result of which the sheet 26 deforms abruptly and assumes the desired geometry of the cavity 25, as represented in FIG. 8. The air behind the sheet is forced out through suitable venting channels or sintered inserts (neither of which are shown).

Directly thereafter, the feed channel 34 is shut off by means of the shut-off spool 33 and a thermoset compound 35 is injected into the cavity 25 by means of the injection-moulding unit 31. During this operation, a control check is kept on the pressure in the cavity 25, which is determined by the mould locking force and the injection pressure.

Nitrogen is used here as pressure medium, which is gradually dispelled completely by the thermoset compound 35.

Figure 9:
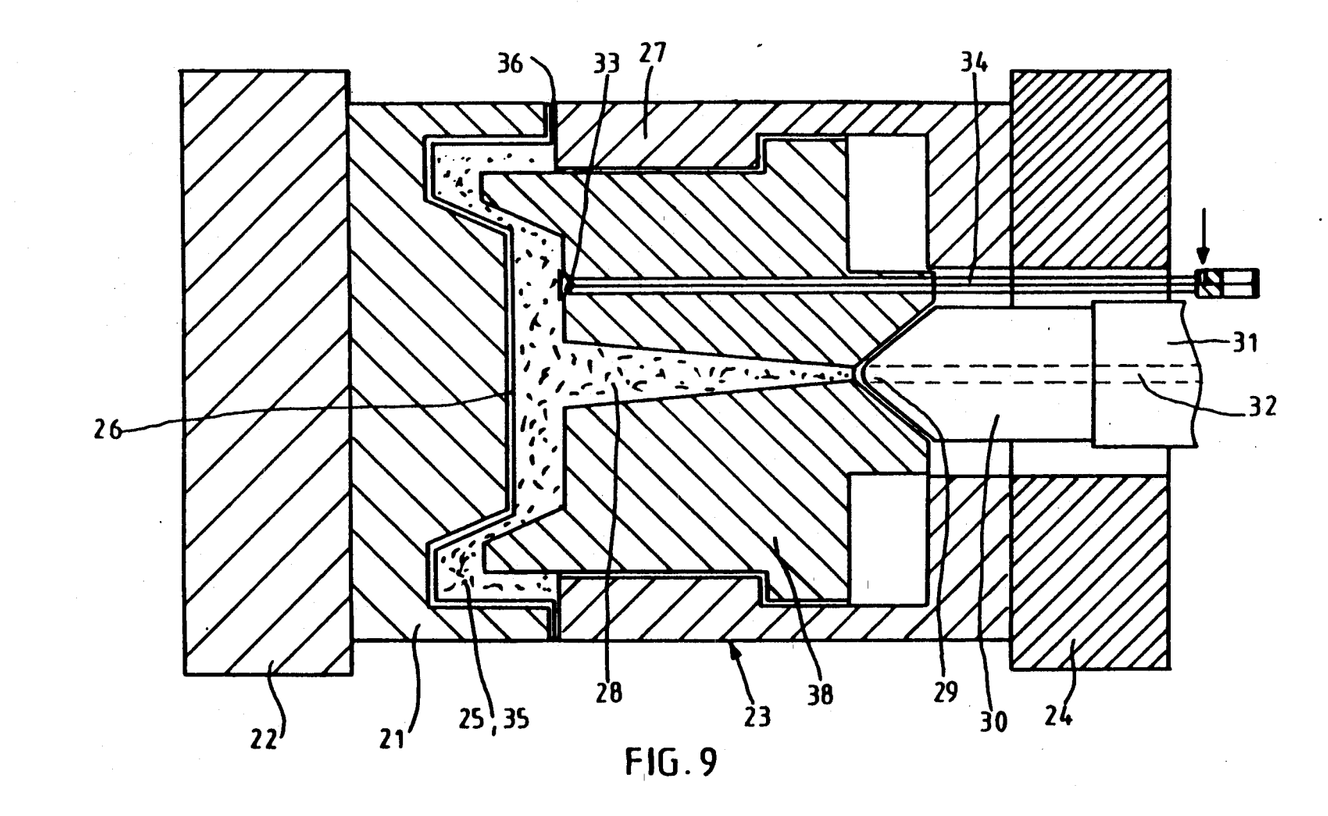

The injection mould can be seen with the cavity filled from FIG. 9.

Figure 10:
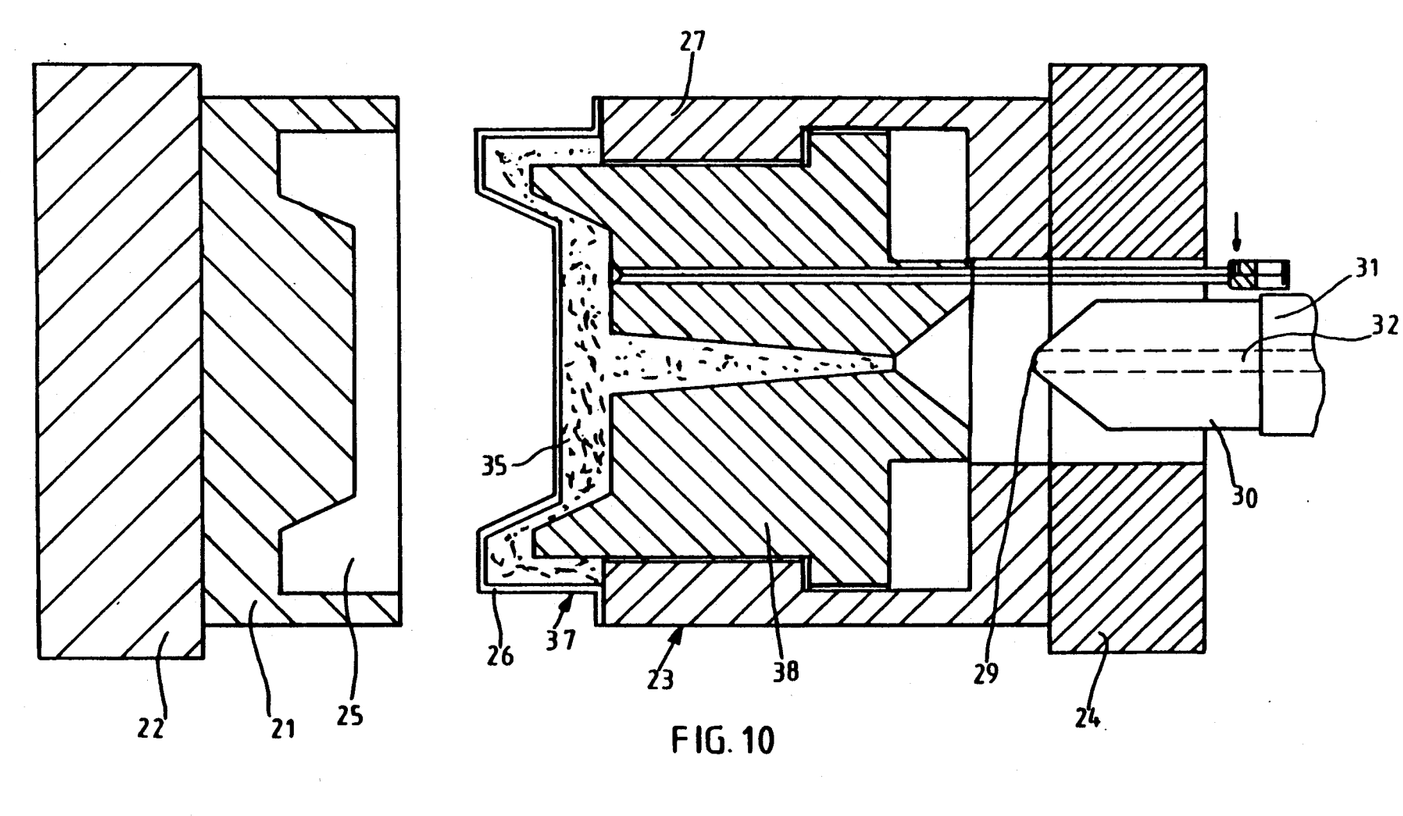

In FIG. 10, finally, the mould opened for removing the finished multi-layer moulding 37 is represented.

Figure 11:
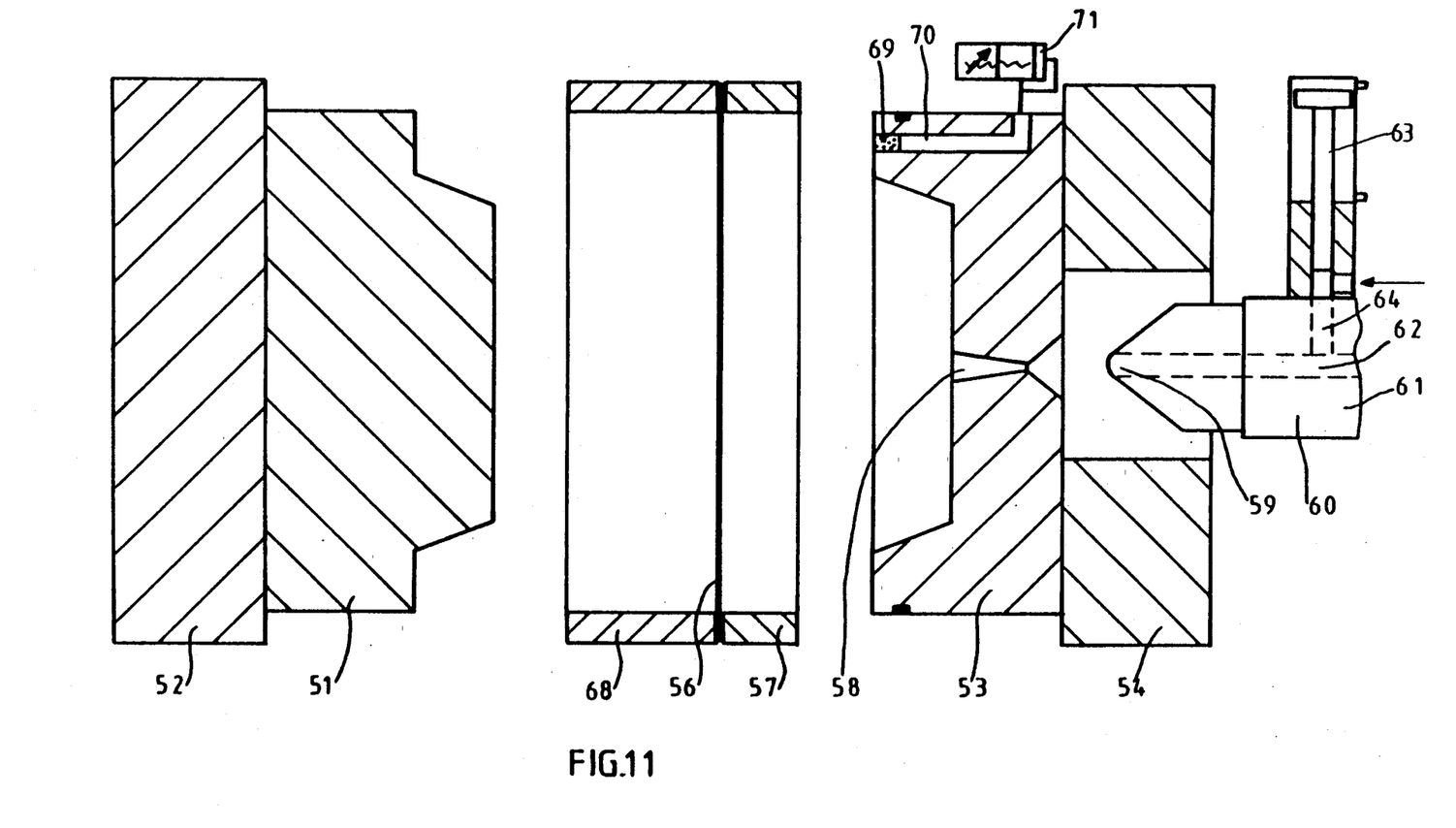
FIGS. 11 to 15 show the process sequence in a third injection mould.
Figure 12:
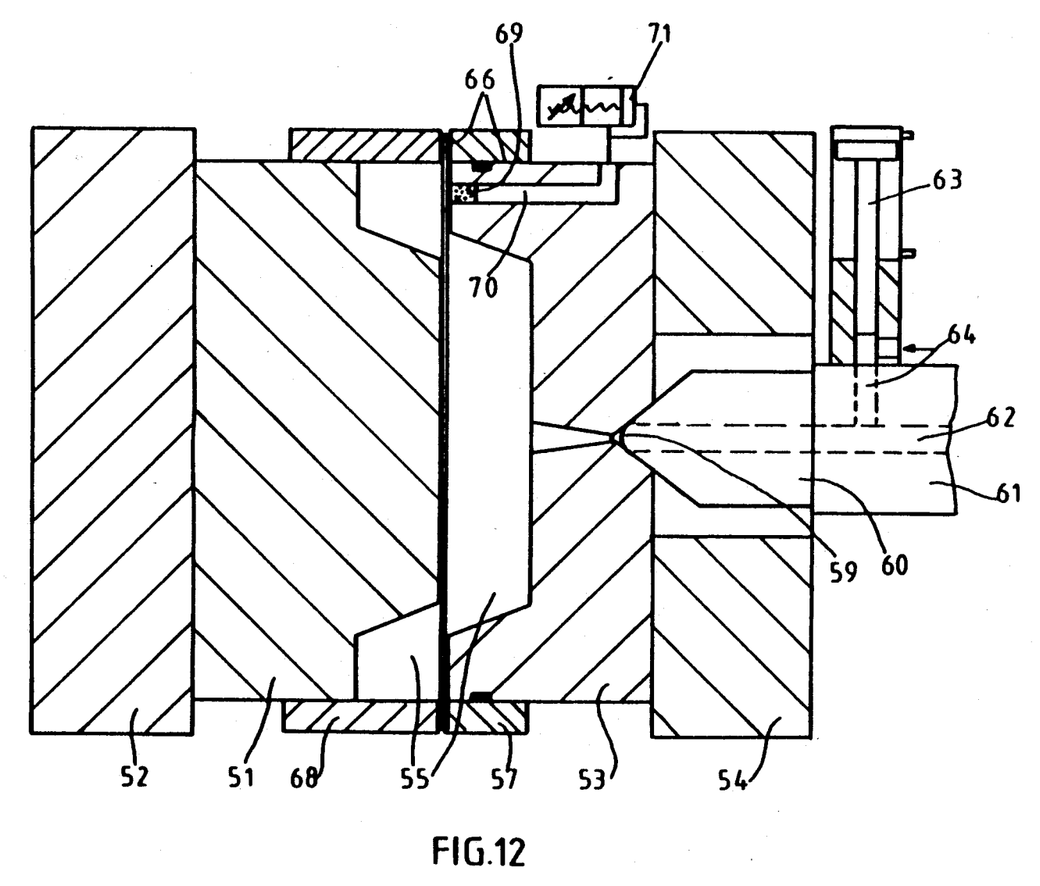

In FIGS. 11 to 15, one mould half 51 of an injection mould is arranged on a platen 52 and a second mould half 53 is arranged on a second platen 54. Together with a clamping frame part 68, the mould half 51 forms a cavity 55 (FIG. 12). A sheet 56 is clamped between this clamping frame part 68 and a clamping frame part 57.

The mould half 53 has a runner 58, which is in connection via a nozzle opening 59 an injection nozzle 60 with an indicated injection-moulding unit 61. This injection nozzle 60 has a channel 62, into which a feed channel 64 for a gaseous pressure medium, which can be shut off by means of a shut-off spool 63, opens.

The channel 62 is connected to the melt space (not shown) of an indicated injection-moulding unit 61.

In FIG. 12, the injectionmould is shown closed. The sheet 55 is held in position by the clamping frame part 57.

Figure 13:
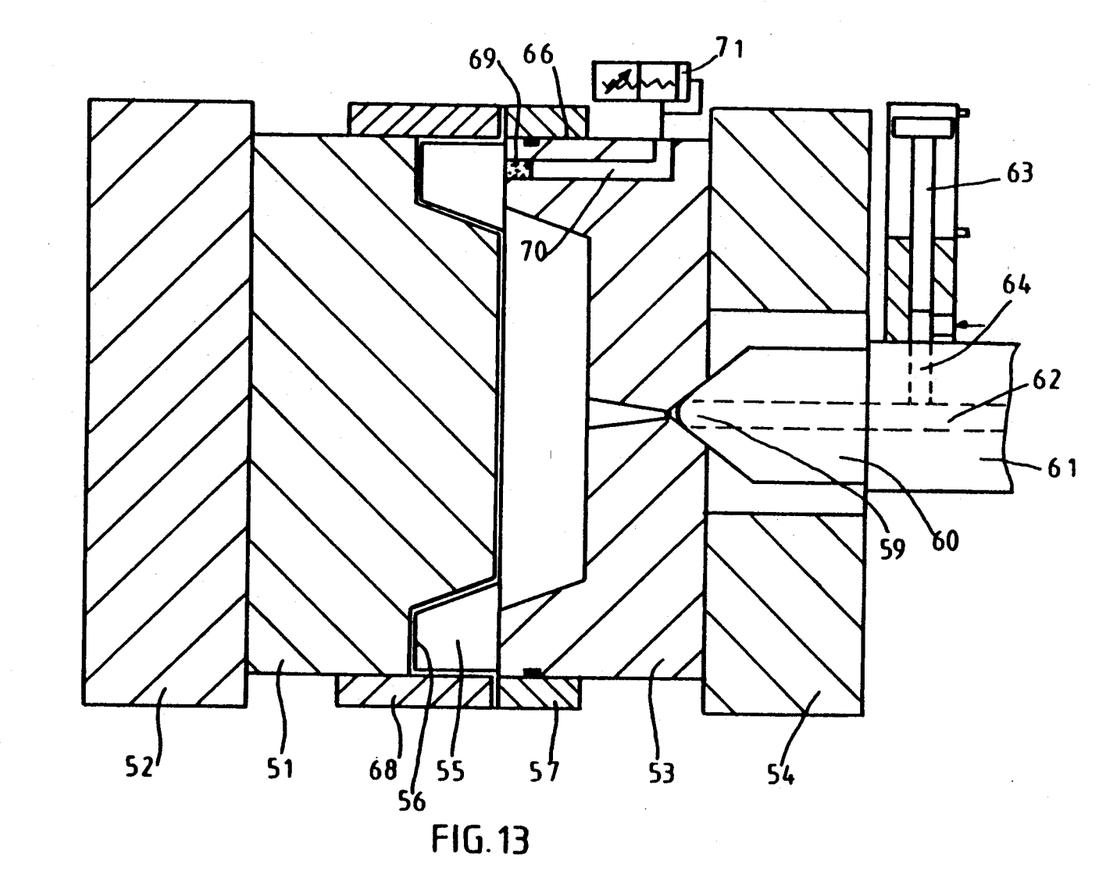

Then nitrogen of 200 bar is introduced via the feed channel 64 and the nozzle opening 55, as a result of which the sheet 56 deforms abruptly and assumes the desired geometry of the cavity 55, as represented in FIG. 13. The air behind the sheet 56 escapes through the gap between the mould half 51 and the clamping frame part 68.

Figure 14:
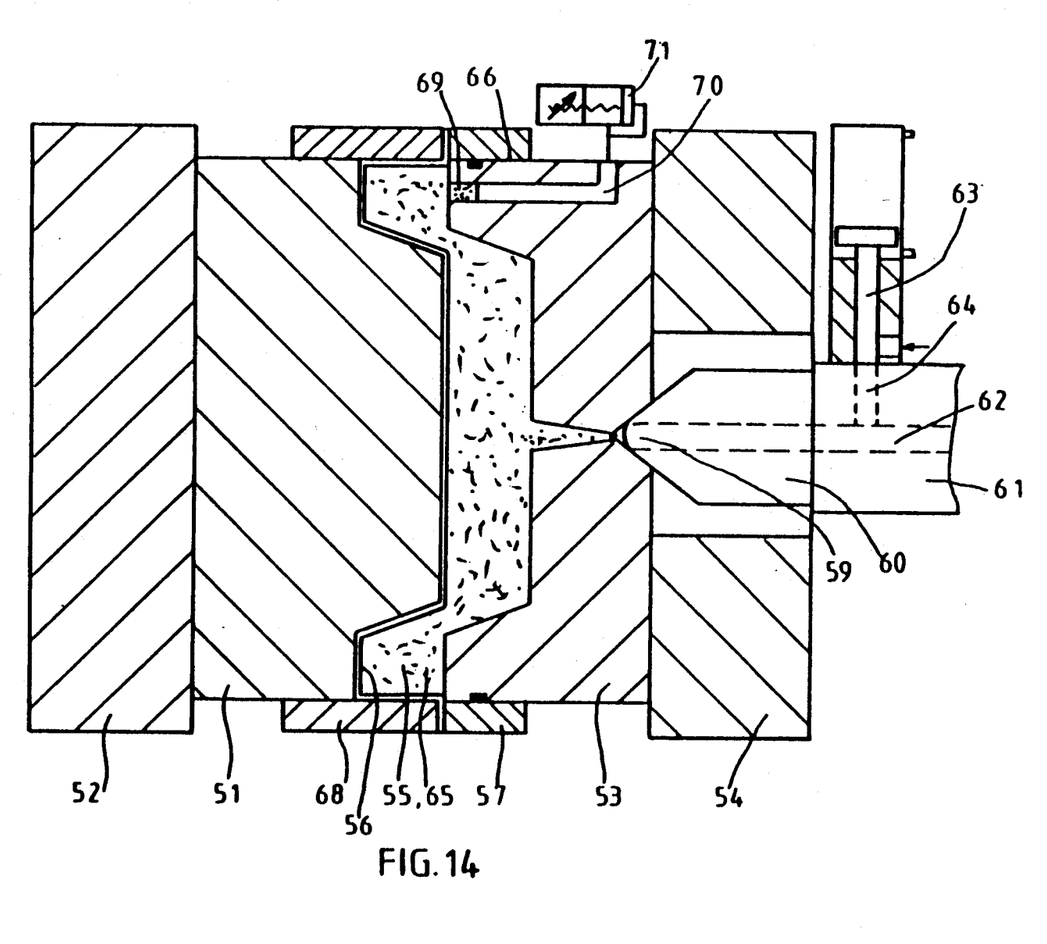

Directly thereafter, a free-flowing thermoplastic compound 65 is injected in through the channel 62 into the cavity 55 by means of the injection-moulding unit 61, the pressure being kept constant by a sintered insert 69, a channel 70 and a pressure-maintaining valve 71. The injection mould is represented in FIG. 14 with cavity 55 filled.

Figure 15:
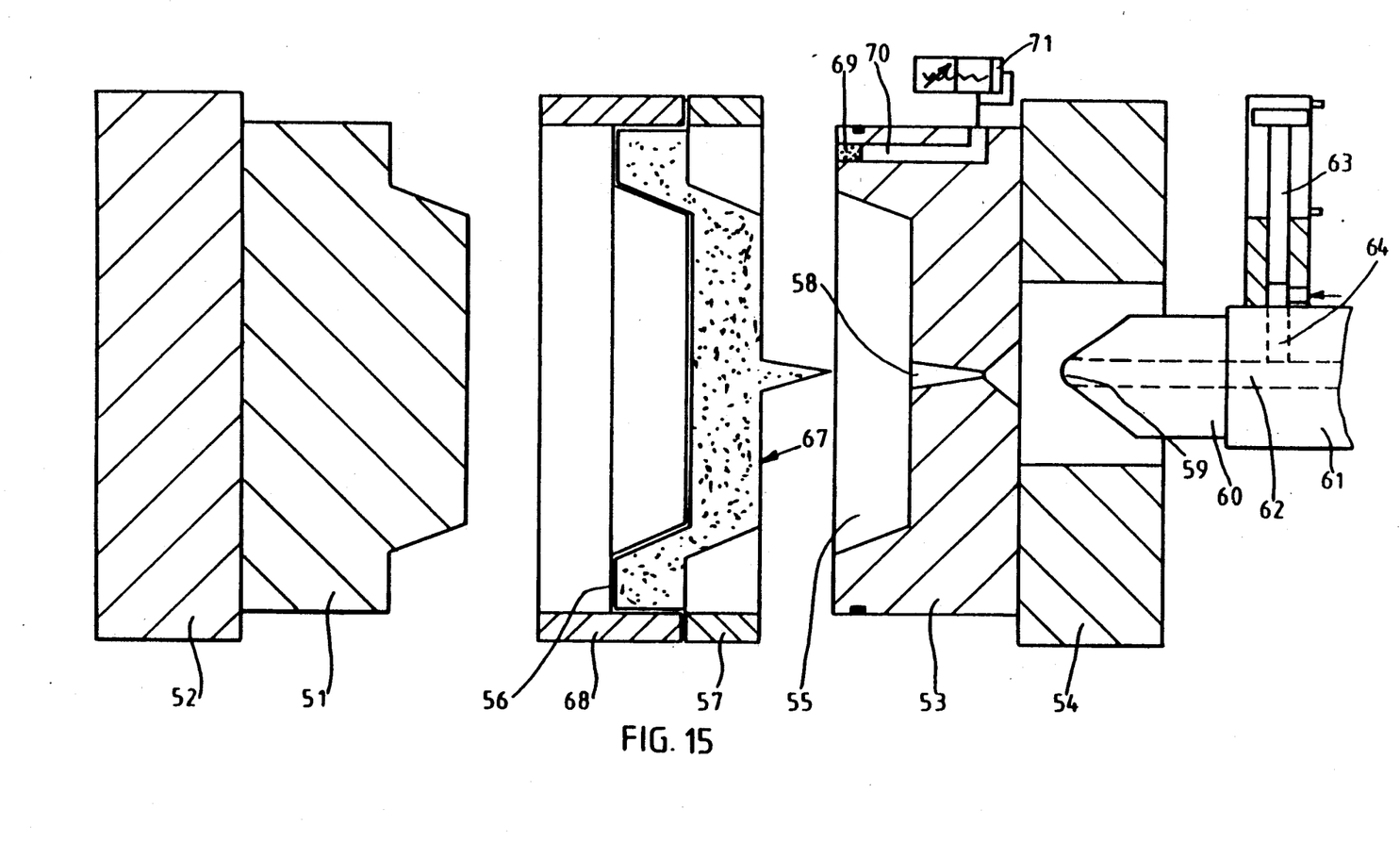

In FIG. 15, finally, the injection mould opened for removing the multi-layer moulding 67 is shown. After taking apart the clamping frame parts 57 and 68, the multi-layer moulding 67 formed can be removed.

We claim:

1. Process for producing multi-layer mouldings from a deformable sheet and a thermoplastic or thermoset resin comprising the steps of deforming the sheet in an injection mould cavity by applying a fluid medium under a pressure of at least 20 bar, injection-moulding the resin onto the sheet in the cavity of the injection mould directly after deformation thereof in the mould cavity, and maintaining the deformed sheet in position in the injection mould by the fluid medium and the resin during the injection-moulding, and wherein the fluid medium is fed through an injection nozzle of an injection-moulding unit of the injection mold.

2. Process for producing multi-layer mouldings from a deformable sheet and a thermoplastic or thermoset resin comprising the steps of deforming the sheet in an injection mould cavity by applying a fluid medium under a pressure of at least 20 bar, injection-moulding the resin onto the sheet in the cavity of the injection mould directly after deformation thereof in the mould cavity, and maintaining the deformed sheet in position in the injection mould by the fluid medium and the resin during the injection-moulding, and wherein the pressure applied for the deformation of the sheet is maintained during the injection-moulding, the pressure rising during the injection-moulding being lowered in a controlled manner, and wherein the fluid medium is fed through an injection nozzle of an injection-moulding unit of the injection mould.

* * * * *